May 1, 1945.  S. W. BRIGGS ET AL  2,374,976
CLARIFYING DEVICE
Filed June 26, 1942  2 Sheets-Sheet 2
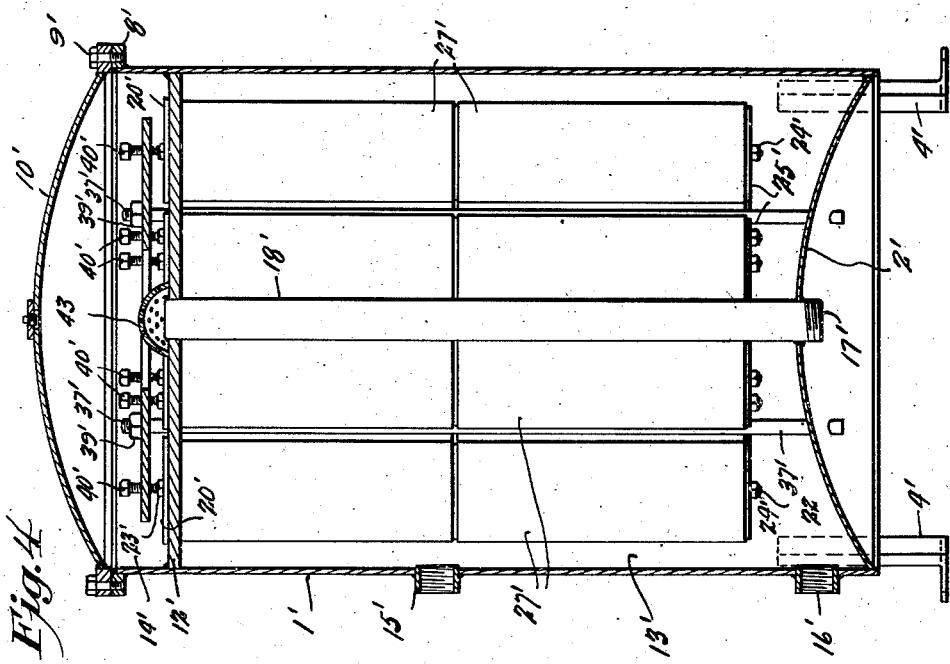
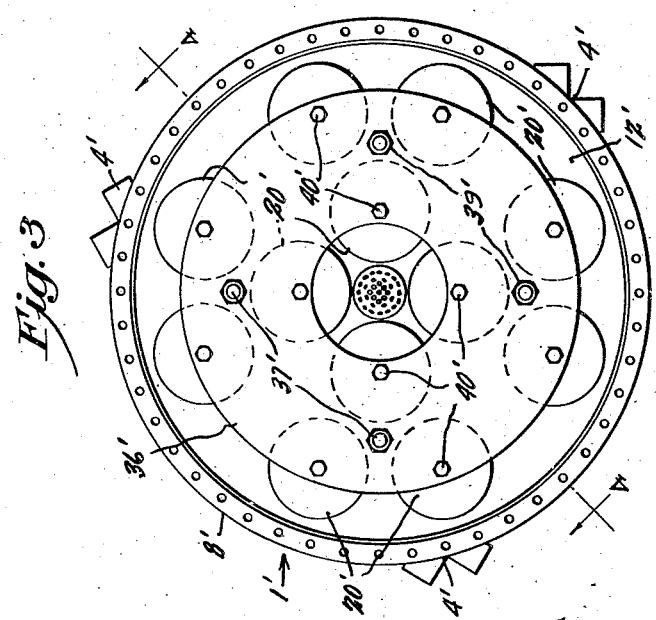
Inventors
Southwick W. Briggs,
Walter C. Bauer and
Walter J. Eubank
By Semmes, Keegin Beale & Semmes
Attorneys Patented May 1, 1945

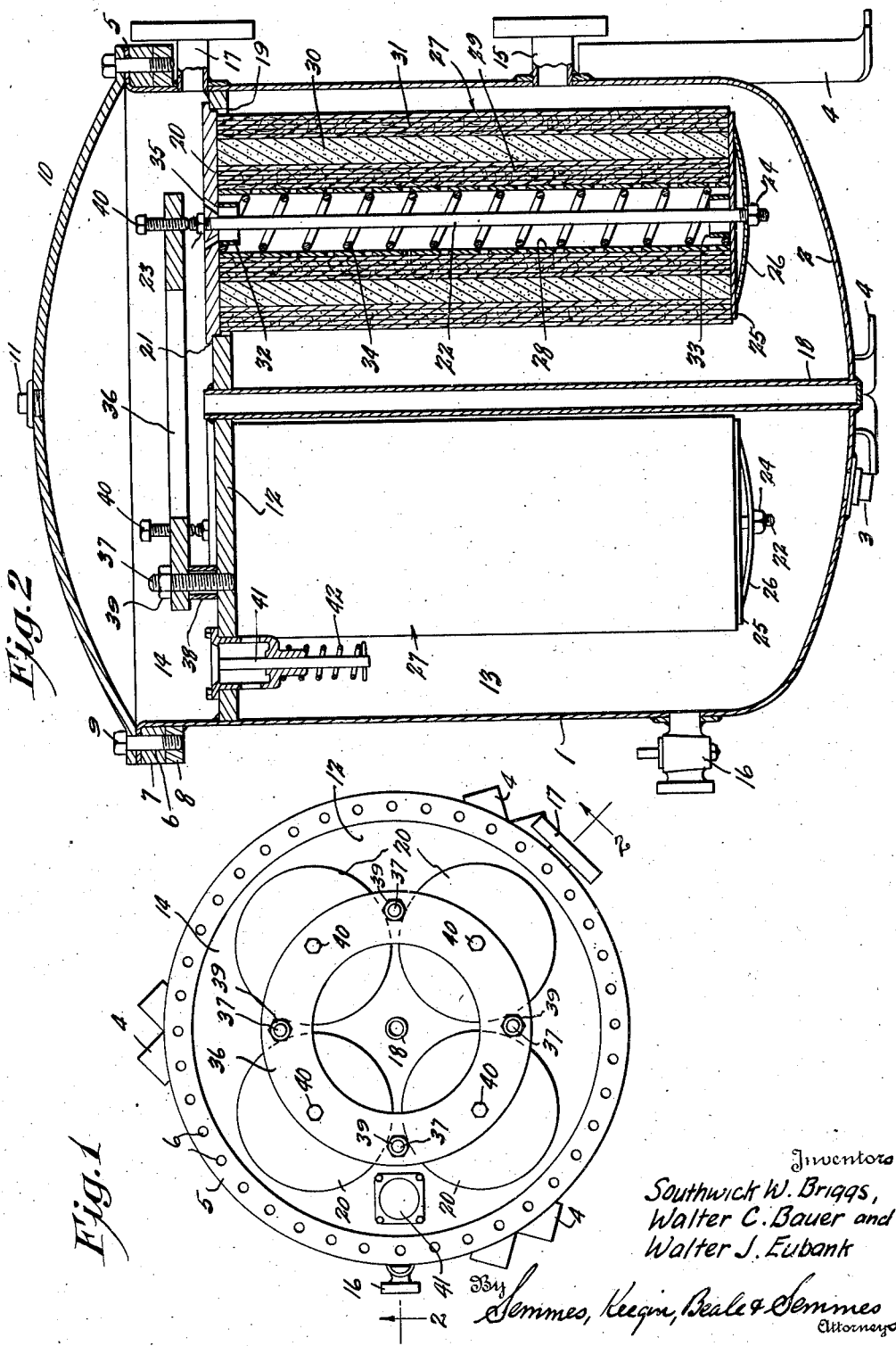

2,374,976

UNITED STATES PATENT OFFICE 2,374,976

CLARIFYING DEVICE

Southwick W. Briggs, Washington, D. C., and Walter C. Bauer, Chevy Chase, and Walter J. Ewbank, Kensington, Md.; said Bauer and said Ewbank assignors to Briggs Clarifier Company, Washington, D. C.

Application June 26, 1942, Serial No. 448,699

9 Claims. (Cl. 210—184)

This invention relates to apparatus for clarifying or purifying fluids and more particularly has reference to such a device for the clarification and purification of lubricating oils in which a plurality of filter elements are mounted and secured within spaced openings in a partition dividing a chamber into several compartments.

In the construction of purifying and clarifying apparatus of the type to which the present invention relates, tubular filter elements mounted on supporting means are inserted within openings in a partition dividing a chamber into a compartment for receiving oil to be filtered and a compartment containing the filtered oil. The means carrying the filter elements are pressed into openings within the partition by screws carried by bridging elements secured to the partition. The custom has been to provide a separate bridge for each of the filter elements. While this method of construction has some advantages, nevertheless, considerable effort is required in placing the filter units in position and considerable material and a large number of parts are required for the construction of the complete apparatus.

An object of this invention is to provide a clarifying or purifying apparatus in which the filter elements are mounted and retained in position within the apparatus in a manner which will overcome the objections to the prior art construction.

Another object of this invention is to provide a clarifying apparatus comprising a chamber wall having a plurality of openings for receiving a plurality of filter elements and means common to all of said filter elements for pressing said filter element into sealing engagement with said wall through which they extend.

A further object of this invention is to provide a clarifying apparatus provided with a supporting wall having a plurality of apertures therein arranged in the form of a circle, a plurality of filter elements mounted in said openings, a circular element carried by said wall, and means carried by said circular element means to retain said filter elements in the apertures in said wall.

Still another object of this invention is to provide a clarifying apparatus having a chamber divided by a partition into a compartment for receiving liquid to be clarified and a compartment for receiving clarified liquid, said partition having a plurality of openings arranged in the form of a circle, a plurality of tubular filter elements mounted on supporting members positioned within said openings and extending into the compartment containing liquid to be filtered, an annular disc secured to said partition in spaced relation thereto within the compartment for receiving filtered liquid, and screw means carried by said annular disc for engaging the filter carrying members for pressing the same within the openings in said partition.

A still further object of this invention is to provide a clarifying apparatus having a chamber divided into a compartment for receiving oil to be clarified and a compartment for receiving clarified oil, said partition having a plurality of openings therein arranged in an inner circular group and an outer circular group, a plurality of filter elements, means carrying said filter elements and mounted within said openings, an annular disc secured to said partition in spaced relation thereto within the compartment for receiving filtered oil, said disc having inner and outer circularly arranged groups of threaded openings coinciding with the openings containing the filter elements, and screw means positioned in said threaded openings and adjustable for pressing the means carrying the filter elements into sealing engagement with said partition.

With these and other objects in view which may appear incident to the present invention, the latter resides in the parts and combinations hereinafter described and illustrated in the drawings and broadly comprises means common to a plurality of filter elements supported in apertures of a wall for pressing the carrying means for said filter elements into sealing engagement with said wall.

In order to more fully illustrate the present invention, embodiments of the same have been shown in the accompanying drawings in which:

Figure 1 is a plan view of a clarifying apparatus constructed in accordance with the present invention and having the top cover removed therefrom.

Figure 2 is a vertical sectional view taken on line 2—2 of Figure 1.

Figure 3 is a view similar to that of Figure 1 illustrating a modified form of clarifying apparatus embodying the principle of the present invention.

Figure 4 is a vertical sectional view taken on line 4—4 of Figure 3.

A clarifying or purifying apparatus particularly suitable for the clarification of lubricating oil for use in internal combustion engines is illustrated in the drawings. As shown, the apparatus comprises a chamber or tank 1 having a closed bottom 2 provided with a sludge outlet 3. Said tank is supported by a plurality of suitably disposed legs or supports 4. At its upper portion, the chamber 1 is provided with a peripheral flange 5 which has a plurality of circumferentially arranged openings 6. Flange 5 is reinforced with annular members 7 and 8. Both of these members have openings corresponding to the openings 6 formed in the flange 5 and the openings in the annular member 8 are threaded to receive screws 9 by means of which a dome-shaped cover 10 is secured to the upper flange 5. A central opening is provided in the cover 10 and is closed by a plug 11.

Adjacent the upper portion of the chamber 1, there is provided a partition 12 which divides the chamber 1 into a lower compartment 13 for receiving oil to be filtered and an upper compartment 14 which receives the filtered oil. An inlet fitting 15 is provided for the suppy of oil into the compartment 13 and a sludge discharge valve 16 is provided near the lower portion of said compartment 13 for discharging sludge therefrom. A discharge fitting 17 is provided in the upper portion of chamber 1 above the partition 12 for the discharge of filtered oil from the compartment 14.

A reinforcing rod or tube 18 extends through a central opening in the partition 12 and through a similar opening in the bottom 2 of the chamber 1. The partition and bottom of the chamber are welded to said rod or tube so as to reinforce the partition 12.

Partition 12 is provided with a plurality of openings 19 which are arranged in circular formation. Mounted in each of the openings 19 is a plate 20 which has a flange portion 21 of a diameter greater than that of the openings 19. Each of the plates 20 has a central aperture 40 through which extends a rod 22 threaded at both ends and provided at its upper end with a nut 23 and at its lower end with a nut 24. A disc 25 is mounted on the lower end of the rod 22 and has a resilient element 26 interposed between the same and the nut 24. Positioned between the upper plate 20 and the lower disc 25 is a filter element 27 which comprises a perforated metal tube 28 surrounded by a layer of cellulosic filtering material 29 which in turn is surrounded by a porous layer of ceramic material such as bauxite 30. Completing the filter is an outer layer of cellulosic material 31. The complete filter may be surrounded by an open mesh net-like fabric (not shown) for maintaining the same in assembled form.

The lower face of plate 20 has a tubular extension 32 depending therefrom and the lower disc 25 has an upstanding tubular extension 33. The tubular extensions 23 and 33 are of an exterior diameter slightly less than the internal diameter of the perforated tube 28 and serves to support a helical coil spring 34 so as to properly center the filter element with relation to the plate 20 and the disc 25.

Plate 20 is provided with a plurality of spaced openings 35 which afford communication between the interior of the tubular filter element and the compartment 14.

The plates 20 carrying the tubular filter elements are positioned within the openings 19 and the annular disc 36 is secured in place by means of studs 37 which are received in threaded openings intermediate the openings 19 as illustrated in Figure 1 of the drawings. Interposed between the annular disc 36 and the partition 12 are spacing elements 38. Suitable nuts 39 threaded on the studs 37 serve to securely fix the annular disc 36 in spaced relation to the partition 12.

Annular disc 36 has a plurality of threaded openings formed therein, the centers of which coincide with the centers of openings 19. Positioned within the openings in the disc 36 are the screws 40 and these are turned down to engage the upper ends of the rods 22 which serve to press the flanged portion 21 of the plates 20 into sealing engagement with the portions of the partition 12 surrounding the opening 19.

The structure described above will effectively position the filter elements in proper relation within the compartment 13 and will effect a seal between the plates 20 and the partition 12 which will insure effective operation of the apparatus.

Partition 12 is provided with an opening equipped with a by-pass valve 41 which is loaded by a spring 42 and is adapted to open when the rate of flow through the filter elements is reduced to such an extent as to create an excess pressure in the compartment 13. When this occurs the valve 41 will open and bypass the flow directly into compartment 14.

The concept of the present invention is applicable to clarifying apparatus embodying more than four filter elements such as shown in Figures 1 and 2 of the drawings. For instance, in Figures 3 and 4 of the drawings an apparatus is shown provided with twelve filter elements which are arranged in two groups, i. e. an inner circular group and an outer circular group. The apparatus shown in Figures 3 and 4 is slightly different from that shown in Figures 1 and 2 in that the tank or chamber 1' is provided with a dome-shaped bottom 2'. In addition, the tube 18' which extends through openings in the bottom 2' and the upper partition 12' communicate with the upper compartment 14' and serve as the discharge outlet for fluid in said compartment 14'. The lower end of said tube 18' is threaded as indicated by reference character 17' by means of which the tube 18' may be connected to discharge means. In this form of the apparatus the liquid to be filtered is introduced through an inlet fitting 15' and the sludge is withdrawn from a discharge outlet 16'.

The principal difference between Figures 3 and 4 and Figures 1 and 2 resides in the fact that the partition 12' separating the compartments 13' and 14' is provided with twelve openings in each of which is mounted a plate 20' carrying filter elements constructed in substantially the same manner as illustrated in Figure 2 of the drawings. While in Figure 2 of the drawings one filter element has been shown positioned between the plates 20 and 25, it is desirable in the larger apparatus shown in Figure 4 of the drawings to provide a pair of filter elements stacked end to end between the plates 25' and 20'.

The filter elements in the apparatus shown in Figures 3 and 4 are mounted in assembled position by screws 40' which are threadedly mounted in two concentric groups of circularly arranged openings in an annular disc 36' which in turn is secured in place to the partition 12' by means of studs 37' on which nuts 39' and spaces 38' are mounted.

The function and operation of the structure shown in Figures 3 and 4 is substantially identical to that shown in Figures 1 and 2. Due to the different arrangement of the discharge outlets 17', the filtered liquid is discharged outwardly through the discharge outlet tube 18'. It has been found desirable to cover the upper end of the tube 18' with a strainer 43.

From the foregoing description, it will be appreciated that the present invention provides a novel, simple and easily assembled and disassembled arrangement for maintaining the filter elements in position in a clarifying or purifying apparatus.

We claim:

1. A clarifying apparatus comprising a chamber having an apertured wall, a plurality of filter elements extending through said apertures, cooperating means on the wall and filter elements for limiting insertion of the elements through the apertures, a plate removably secured in spaced relation to and on the exterior of said wall, and means engaging said plate for pressing all of said filter elements into said apertures.

2. A clarifying apparatus comprising a chamber having a supporting wall provided with a plurality of spaced openings therein the centers of which are arranged in the form of a circle, a plurality of filter elements extending through said openings, cooperating means on the wall and filter elements for limiting insertion of the elements through the openings, a disc removably secured in spaced relation to and on the exterior of said wall, said disc having its center coinciding with the center of said circle in which the openings lie, and a plurality of means carried by said disc for engaging and pressing said filter elements into said openings.

3. A clarifying apparatus comprising a chamber having a supporting wall having a circularly arranged group of openings therein, a plurality of filter elements, means carrying said filter elements and mounted in said openings, said means having portions cooperating with the wall for limiting insertion of the elements through the openings, a disc, means intermediate adjacent openings for removably securing said disc in spaced relation on the exterior of said supporting plate, the center of said disc coinciding with the center of the circle in which the openings are arranged and the diameter of said disc exceeding the diameter of said circle, and screws carried by said disc and engaging the means carrying the filter elements for retaining them in said openings.

4. A clarifying apparatus comprising a chamber having a supporting wall having a circularly arranged group of openings therein, a plurality of filter elements, means carrying said filter elements and mounted in said openings, said means having portions cooperating with the wall for limiting insertion of the elements through the openings, an annular disc, means intermediate adjacent openings for removably securing said disc in spaced relation on the exterior of said supporting plate, the center of said disc coinciding with the center of the circle in which the openings are arranged and the diameter of said disc exceeding the diameter of said circle, and screws carried by said disc and engaging the means carrying the filter elements for retaining them in said openings.

5. A clarifying apparatus comprising a chamber having a supporting wall having an inner circularly arranged group of openings and an outer circularly arranged group of openings the two groups of circularly arranged openings being concentric, means carrying said filter elements and mounted in said openings, said means having portions cooperating with the wall for limiting insertion of the elements through the openings, a disc, means intermediate adjacent openings for removably securing said disc in spaced relation to and on the exterior of said supporting plate, the center of said disc coinciding with the center of the concentric circles in which the openings are arranged and the diameter of said disc exceeding the diameter of the circle of the outer group of openings, and screws carried by said disc and engaging each of the means carrying the filter elements for retaining them in said openings.

6. A clarifying apparatus comprising a chamber having a supporting wall having an inner circularly arranged group of openings and an outer circularly arranged group of openings the two groups of circularly arranged openings being concentric, means carrying said filter elements and mounted in said openings, said means having portions cooperating with the wall for limiting insertion of the elements through the openings, an annular disc, means intermediate the two groups of openings for removably securing said disc in spaced relation to the supporting plate on the exterior thereof, the center of said annular disc coinciding with the center of the concentric circles in which the openings are arranged, the exterior diameter of said annular disc exceeding the diameter of the circle containing the outer groups of openings and the interior diameter of said annular disc being less than the diameter of the circle in which the inner group of openings are arranged, and means carried by said disc and engaging each of the means carrying the filter elements for retaining them in said openings.

7. A clarifying apparatus comprising a chamber having a partition wall therein dividing the chamber into a compartment for receiving fluid to be filtered and a compartment for receiving filtered fluid, said partition having a plurality of apertures therein, a plurality of filter elements mounted in said apertures and extending into the compartment for receiving liquid to be filtered, cooperating means on the partition and filter elements for limiting insertion of the elements through the apertures, a plate removably secured in spaced relation to and on the exterior of said partition and means carried by said plate for engaging each of said filter elements and pressing the same into said apertures.

8. A clarifying apparatus comprising a chamber having a partition wall therein, dividing the chamber into a compartment for receiving fluid to be filtered and a compartment for receiving filtered fluid, said partition having a plurality of apertures therein, said apertures being arranged in said partition in the form of a circle, a plurality of filter elements, means carrying said filter elements and mounted in said openings, cooperating means on the partition and filter elements for limiting insertion of the elements through the openings in said partition, an annular disc, means intermediate adjacent openings for removably securing said disc in spaced relation to said partition within the compartment containing filtered liquid, the center of said disc coinciding with the center of said circle in which the apertures are arranged, the exterior diameter of said disc exceeding the diameter of said circle and the interior diameter of said disc being less than the diameter of said circle and screws carried by said disc and engaging each of the means carrying the filter elements for retaining them in said apertures.

9. A clarifying apparatus comprising a chamber having a partition wall therein, dividing the chamber into a compartment for receiving fluid to be filtered and a compartment for receiving filtered fluid, said partition having a plurality of apertures therein, said apertures being positioned in an inner circularly arranged group and in an outer circularly arranged group, the two groups of circularly arranged apertures being concentric, a plurality of filter elements, means carrying said filter elements and being mounted within said apertures with the filter elements projecting into the compartment containing a fluid to be filtered, cooperating means on the partition and filter elements for limiting insertion of the elements through the apertures in the partition, an annular disc removably secured to the partition in spaced relation thereto within the compartment containing filtered fluid, said disc having a plurality of circularly arranged threaded openings the centers of which coincide with those of the openings in said partition, and screws threadedly mounted in said threaded openings for engaging each of the means carrying the filter elements for pressing the same into said apertures.

SOUTHWICK W. BRIGGS.
WALTER C. BAUER.
WALTER J. EWBANK.